United States Patent [19]
Atkins et al.

[11] Patent Number: 5,745,615
[45] Date of Patent: Apr. 28, 1998

[54] METHOD OF MAKING AN OPTICAL FIBER GRATING, AND ARTICLE MADE BY THE METHOD

[75] Inventors: Robert Michael Atkins, Millington; Rolando Patricio Espindola, West Orange; Debra Ann Simoff, South Plainfield, all of N.J.

[73] Assignee: Lucent Technologies Inc., Murray Hill, N.J.

[21] Appl. No.: 730,531

[22] Filed: Oct. 11, 1996

[51] Int. Cl.[6] .................................................. G02B 6/34
[52] U.S. Cl. ......................... 385/37; 65/425; 385/12; 385/24; 385/123; 430/290; 430/321
[58] Field of Search ........................... 385/10, 12, 13, 385/24, 31, 37, 123, 124, 128; 430/290, 321; 65/392, 425

[56] References Cited

U.S. PATENT DOCUMENTS

| | | | |
|---|---|---|---|
| 5,104,209 | 4/1992 | Hill et al. | 385/37 X |
| 5,157,747 | 10/1992 | Atkins et al. | 385/37 |
| 5,208,877 | 5/1993 | Murphy et al. | 385/12 |
| 5,235,659 | 8/1993 | Atkins et al. | 385/124 |
| 5,604,829 | 2/1997 | Bruesselbach | 385/37 |
| 5,620,495 | 4/1997 | Aspell et al. | 385/123 X |

OTHER PUBLICATIONS

"Measurement of the Ultraviolet Absorption Spectrum of Optical Fibers", by R. M. Atkins, *Optics Letters*, vol. 17, No. 7, Apr. 1, 1992, pp. 469–471.

"Growth of Bragg Gratings Produced by Continuous–Wave Ultraviolet Light in Optical Fiber", by H. Patrick et al., *Optics Letters*, vol. 18, No. 18, Sep. 15, 1993, pp. 1484–1486.

*Primary Examiner*—John D. Lee
*Attorney, Agent, or Firm*—Eugen E. Pacher

[57] ABSTRACT

The method of making an optical fiber refractive index grating comprises writing the grating through the fiber coating. The method involves providing optical fiber of significantly higher photosensitivity than conventional fiber, such that the grating can be written before unacceptable darkening of the coating occurs. Such fiber is $H_2$ and/or $D_2$-loaded silica-based fiber having a Ge-doped core, the fiber selected to have a germanium-oxygen deficiency center content that provides the fiber with a photosensitivity that is at least twice as large as that of an otherwise identical, conventionally prepared, optical fiber. The fiber typically is drawn from a preform, at least a portion of which was exposed to a reducing atmosphere at an elevated temperature.

13 Claims, 3 Drawing Sheets

METHOD OF MAKING AN OPTICAL FIBER GRATING, AND ARTICLE MADE BY THE METHOD

FIELD OF THE INVENTION

This invention pertains to making optical fiber refractive index gratings and to articles or systems (collectively "articles") that comprise such a grating.

BACKGROUND

Optical fiber refractive index gratings (henceforth "gratings") are important constituents of many optical communication systems. They are usually fabricated by a process that comprises loading of the fiber with $H_2$ or deuterium ($D_2$), and exposure of the optical fiber to actinic radiation, typically UV radiation.

U.S. Pat. No. 5,157,747, incorporated herein by reference, discloses techniques for making germanosilicate fiber having a relatively high $GeO/GeO_2$ ratio, and also discloses that such fiber can be advantageously used for making optical fiber gratings.

U.S. Pat. No. 5,235,659 discloses low temperature $H_2$ or $D_2$-loading of germanosilicate optical fiber, and exposing the fiber to actinic radiation to produce a grating having relatively large refractive index variation.

A grating in optical fibers is typically "written" in bare fiber, i.e., in a section of the fiber from which the conventional polymer coating has been removed. This necessitates re-coating of the fiber. Not only is this time consuming but coating removal and re-coating frequently result in degradation of the fiber strength. Clearly, it would be highly desirable to be able to write refractive index gratings in coated fiber. Co-assigned U.S. patent application Ser. No. 08/515,625, (now U.S. Pat. No. 5,620,495) incorporated herein by reference, discloses such writing through the coating. However, at least some fiber coatings darken under relatively modest UV exposure, preventing attainment of significant index change in the core of conventional fiber. The instant application discloses an improved method of making fiber gratings that involves writing of the grating through the polymer coating thereof.

SUMMARY OF THE INVENTION

We have found that at least some coatings (typically polymer coatings, including glass resin coatings), which have otherwise desirable physical and optical characteristics, darken quite quickly (e.g., within about 1 minute) on exposure to conventionally used UV laser radiation of conventionally used intensity, and germanosilicate fiber, even with high levels of $H_2$- or $D_2$-loading (henceforth collectively "sensitizer-loading"), frequently do not respond quickly enough to the UV radiation to give usable gratings. We not only discovered this problem but also found a solution, i.e., a method of making an optical fiber grating that can produce a significant change of refractive index (e.g., $\geq 10^{-4}$) in the core of germanosilicate fiber by UV exposure through the fiber coating in a time short enough to avoid unacceptable darkening of the coating.

More specifically, the invention is embodied in a method of making an article comprising an optical fiber grating, the method comprising providing a sensitizer-loaded $SiO_2$-based optical fiber having a Ge-doped core, and exposing the optical fiber to actinic radiation such that the grating is formed in the core.

Significantly, the optical fiber is exposed to the actinic radiation through the fiber coating, and the optical fiber is selected to have a sufficient concentration of germanium-oxygen deficiency centers to provide the fiber with a photosensitivity that is at least twice (preferably 10 times or more) the photosensitivity of an otherwise identical, conventionally prepared, optical fiber, where "photosensitivity" is $\Delta n$/dose of actinic radiation, where $\Delta n$ is the refractive index change that results from exposure of the fiber to a predetermined dose of the actinic radiation.

The above referred to "germanium-oxygen deficiency center", to be referred to as "GODC", is the defect species recognized to be responsible for the photorefractivity of Ge-doped silica. This species has also been referred to as "GeO" or "$Ge^{2+}$". See, for instance, the '747 patent and R. M. Atkins, *Optics Letters*, Vol. 17(7), p. 469 (1992).

By "grating" we mean herein not only conventional Bragg gratings (chirped as well as unchirped, blazed as well as unblazed) but also long period gratings (possibly also chirped and/or blazed). The latter have grating period $\Lambda > \lambda$, where $\lambda$ is the wavelength of the relevant radiation, e.g., 980 nm.

DETAILED DESCRIPTION

Figure 1:
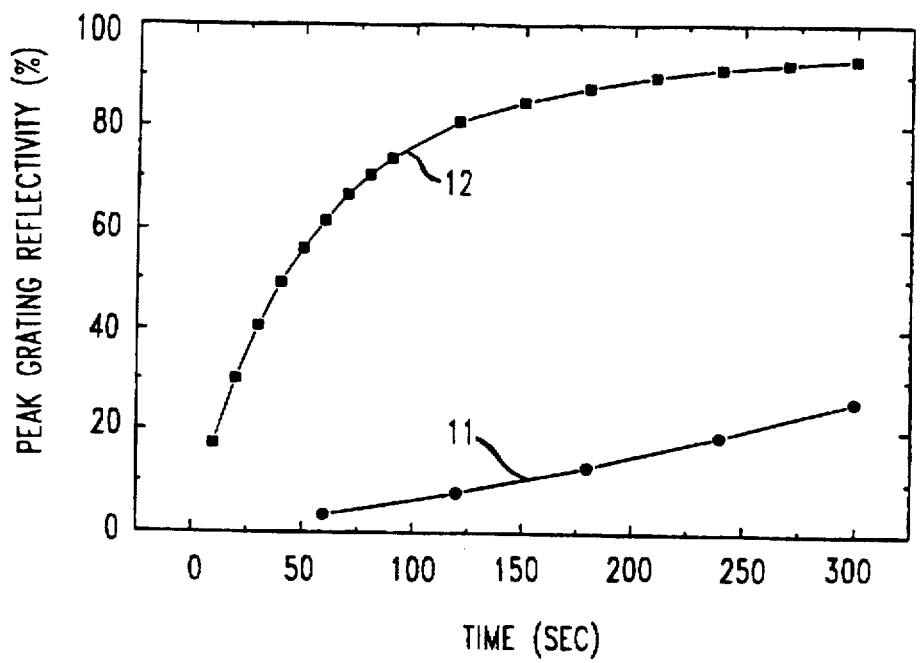
FIG. 1 shows exemplary data on peak grating reflectivity vs. time of exposure to actinic radiation of conventionally prepared (low GODC concentration) prior art fiber and fiber according to the invention. Peak grating reflectivity is a measure of refractive index change $\Delta n$, and the value of $\Delta n$ can be determined from a measured value of peak grating reflectivity of a given grating.

Our invention is predicated on the finding that sensitizer-loaded germanosilicate fiber, prepared to have an elevated GODC concentration in the core, can attain a significant value of refractive index change ($\Delta n$) upon exposure to a relatively small dose of actinic (typically UV) radiation.

Fiber according to the invention is significantly more (e.g., double or more) photosensitive than otherwise identical, conventionally prepared, comparison fiber. In consequence of the relatively high photosensitivity of fiber according to the invention it is typically possible to write a grating of significant strength (e.g., >10% peak reflectivity) in the coated fiber before substantial darkening of the coating occurs. The darkening of interest herein is a decrease of transmittivity at the wavelength of the actinic radiation, typically UV radiation, e.g., at 242, 248 or 257 nm.

By a "conventionally prepared" fiber we mean herein a (sensitizer loaded) fiber that was drawn from a preform that was prepared by a method that did not comprise a (typically elevated temperature) step during which germanosilicate preform material is contacted with an atmosphere selected to favor reduction of $Ge^{4+}$ to $Ge^{2+}$ in the preform material, i.e. an atmosphere that favors GODC formation.

Optical fiber useful in the practice of the invention is sensitizer-loaded fiber drawn from a preform that was prepared by a method that comprises a step (typically a high temperature step) during which germano-silicate preform material is contacted with an atmosphere that favors reduction of $Ge^{4+}$ to $Ge^{2+}$, and thereby to result in an elevated GODC level in the fiber core. For more detail, see the '747 patent. Exemplarily the step involves collapse of the preform tube in such an atmosphere, as described in detail below, or it involves exposure of the preform rod at elevated temperature (e.g., 1000°–1500° C.) to $H_2$ (or $D_2$) for an extended period (e.g., 1–24 hours).

The presence of an elevated GODC level in the core of a germanosilicate fiber can be readily determined in the manner described in the above cited *Optics Letters* article. Currently preferred is determination of the absorbance at 240 nm, which is directly proportional to the concentration of GODCs in the core. A conventionally prepared comparison fiber will typically have attenuation at 240 nm of about 10 dB/mm mol % Ge (e.g., fiber having 3 mol % Ge in the core exhibits 30 dB/mm attenuation at 240 nm), and fiber according to the invention will typically have at least twice as much attenuation at 240 nm, preferably 10 times as much or even more. That is to say, the fiber according to the invention has at least 20 dB/mm mol % Ge attenuation, preferably 100 dB/mm mol % Ge.

The presence of an elevated GODC level in the fiber core of sensitizer-loaded fiber translates directly into increased photosensitivity of the fiber. This is a surprising result not suggested by the prior art, possibly indicative of synergistic action between the two sensitizing modes. It should be noted that the maximum attained index change typically is substantially independent of the GODC level, depending in a given fiber typically substantially only on the amount of sensitizer-loading and the Ge doping level, and that the maximum index change that can be produced solely by means of an elevated GODC level typically is relatively small (compared to that attainable by $H_2$- loading), typically $<10^{-4}$. The '747 patent discloses several techniques that can result in enhanced GODC level in the fiber core, and thus in fiber having an increased GODC level in the core, as compared to conventionally prepared fiber.

An advantageous technique for enhancing the GODC level is preform collapse in a reducing atmosphere, exemplarily substantially $O_2$- free atmosphere (e.g., 100% He, or He with 5–10 volume % Cl). The high temperature of the collapse (e.g., 2300° C.) promotes the formation of GODCs, accompanied by the liberation of oxygen, which typically diffuses away. The technique advantageously also comprises carrying out at least the initial portion of cooling of the collapsed preform in a reducing atmosphere, e.g., the same atmosphere as used during collapse.

It should be noted that the collapse atmosphere need not be essentially $O_2$- free but may comprise some $O_2$, provided the $O_2$ content is sufficiently low (e.g., less than about 10% b.v), to provide reducing conditions.

Optical fiber with relatively high photorefractivity was produced as follows:

A preform tube was prepared in conventional manner, in substantially the same way as for Lucent Technologies Inc. standard 5D® single mode fiber, with 9 fluorophosphosilicate cladding layers and a single germanosilicate core layer, doped to give $\Delta^+=0.43\%$. The tube was collapsed in an atmosphere of 91% He, 5% Cl, and 4% $O_2$, all by volume. Use of an $O_2$- free atmosphere would very likely have produced a still higher concentration of GODCs. The standard core etch that is conventionally performed halfway through the collapse was not done, in order not to decrease the GODC level in the core.

Fluorescence profiling of the collapsed preform indicated a GODC level approximately 10 times that of standard 5D fiber. This implies that the high GODC fiber has at 240 nm an attenuation of about 400 dB/mm, giving about 3.2 dB trans-core attenuation (for 8 μm core). Standard 5fiber thus will absorb about 7% of incident 240 nm photons, and the high GODC fiber will absorb about 52% (all trans-core). The attenuation at 257 nm is about ⅓ of the attenuation at 240 nm.

Single mode optical fiber was drawn in conventional manner from the high GODC preform. The fiber was substantially like standard 5D fiber, except for GODC density. Both high GODC fiber and normal 5D fiber were then subjected to the same sensitizer-loading treatment, namely, 4 days at 50° in 295 atmospheres of $D_2$.

After removal of the polymer coating from a length of each of the 5D fiber and the high GODC fiber, Bragg gratings were written in the fibers under identical writing conditions (40 mW, 5 minutes, 257 nm), using a conventional phase grating. FIG. 1 shows exemplary results for 10 mm grating length. Curve 11 of FIG. 1 pertains to the grating in the sensitizer-loaded conventionally produced 5D fiber, and curve 12 to the grating in the sensitizer-loaded high GODC fiber. As can readily be seen, the difference between the two curves is dramatic. For instance, 120 seconds of exposure yielded a 10% reflectivity grating in the former, and an 80% reflectivity grating in the latter. The latter fiber clearly has substantially higher (significantly more than double) photosensitivity than the former. Values of peak grating reflectivity can be readily converted to corresponding values of index modulation, and thus of photosensitivity. See, for instance, H. Patrick et al., *Optics Letters*, Vol. 18(18), p. 1884 (1993).

It will be understood that substantially any coating material (typically polymer material) that has sufficiently low absorption at some appropriate UV wavelength can potentially be used in the practice of the invention, and practitioners will generally derive a benefit from the use of high GODC, sensitizer-loaded fiber of high photosensitivity.

In order to evaluate the suitability of high GODC fiber for writing through the coating, high GODC 5D-type fiber was drawn from the preform and coated with a substantially UV-transparent, 25 μm thick polymer coating.

This was followed by sensitizer-loading (about 1.5 atomic %). A Bragg grating was written through the polymer coating, using a phase mask, a 15 cm cylindrical lens and 40 mW of 257 nm CW laser light from a frequency-doubled Ar ion laser.

Figure 2:
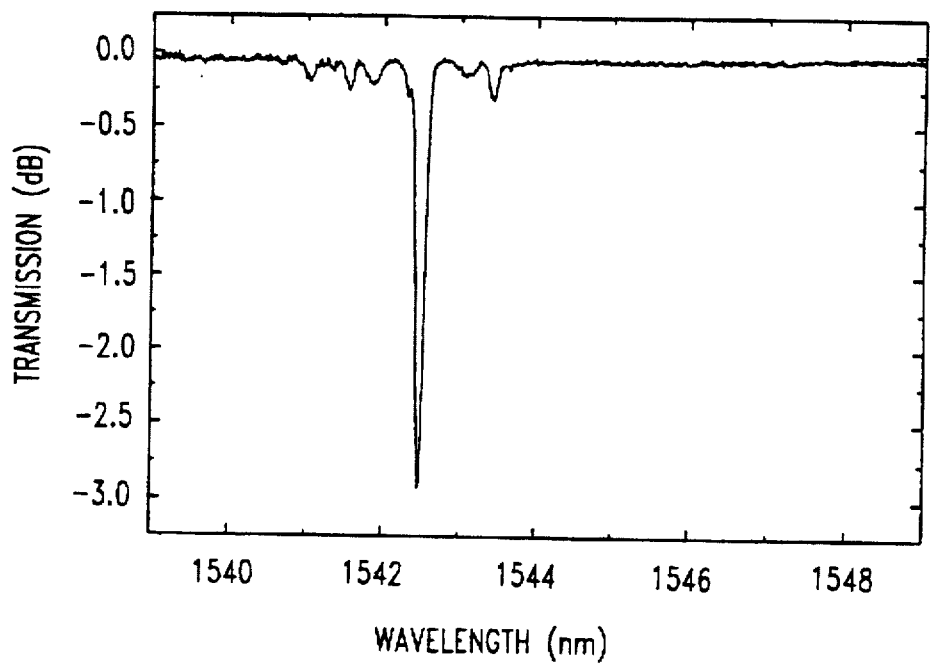
FIGS. 2 and 3 show transmission vs. wavelength of an exemplary grating written in, respectively, coated and uncoated, high GODC fiber.

FIG. 2 shows the transmission spectrum of a 3 dB Bragg grating written through the 25 μm coating. The lens position was adjusted such that the laser light was focused ~1 mm beyond the fiber core. The exposure time was limited to about 60 seconds due to darkening of the coating material.

Figure 3:
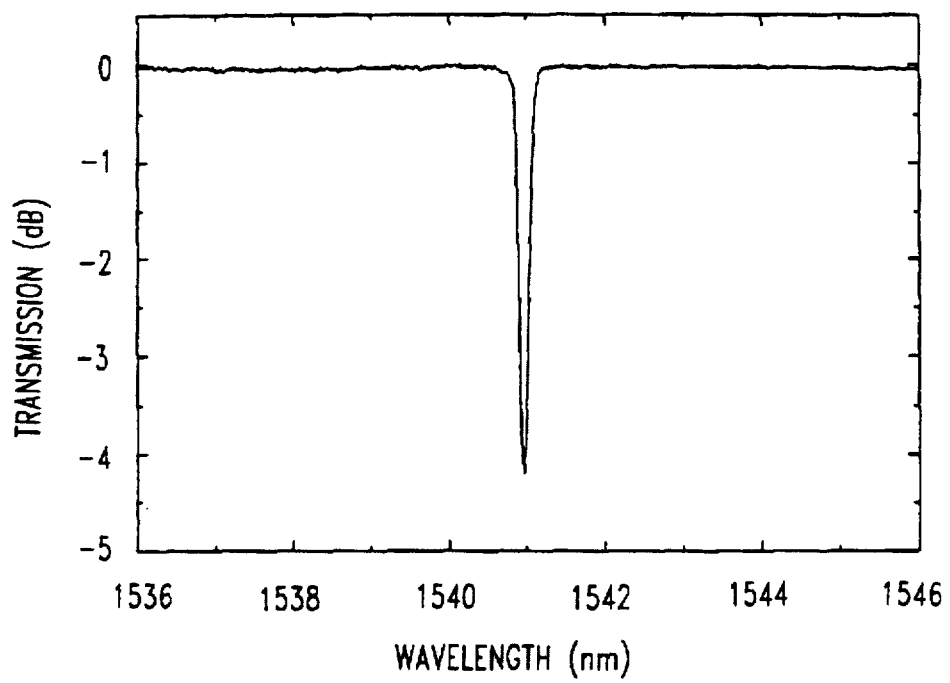

The spectrum of FIG. 2 has side lobes. These are believed to be due to coating imperfections. This belief is supported by the spectrum of FIG. 3, which was obtained from a grating that was written under identical conditions in otherwise identical uncoated fiber. As can be seen, the spectrum of FIG. 3 is essentially free of side lobes.

Gratings according to the invention can be used in a variety of applications in optical fiber communication systems, e.g., as 980 nm pump stabilizer. However, use is not limited to communication systems. For instance, the gratings can be used in fiber sensors, e.g., strain sensors or temperature sensors.

Figure 4:
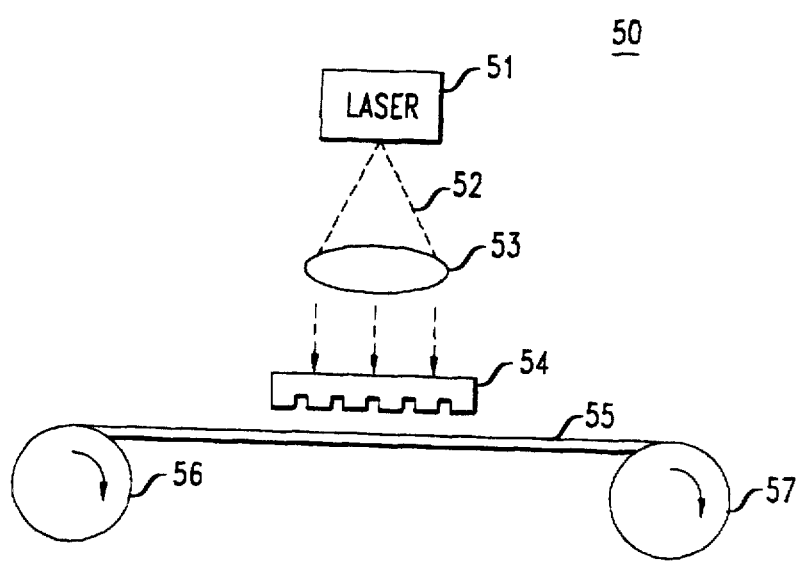
FIG. 4 schematically shows relevant features of a quasi-continuous method of making gratings according to the invention.

The novel method of making gratings facilitates making the gratings by a quasi-continuous process, and such an embodiment of the method is contemplated. See FIG. 4, which shows a length of coated, sensitizer-loaded high GODC fiber being transferred from one fiber spool 56 to take-up spool 57 past phase grating 54. At predetermined intervals (e.g., 2 m spacing) the transfer is stopped for an appropriate length of time, e.g., 60 seconds, and a grating is written into the fiber core by exposing the coated fiber to actinic radiation 52 from laser 51, appropriately conditioned by means of beam conditioner 53, and transmitted through phase grating 54. Subsequently the length of fiber is divided into individual gratings with pigtails and is connectorized. It will be evident that such quasi-continuous processing can result in significant cost savings beyond those that accrue due to avoidance of coating removal and re-application.

Figure 5:
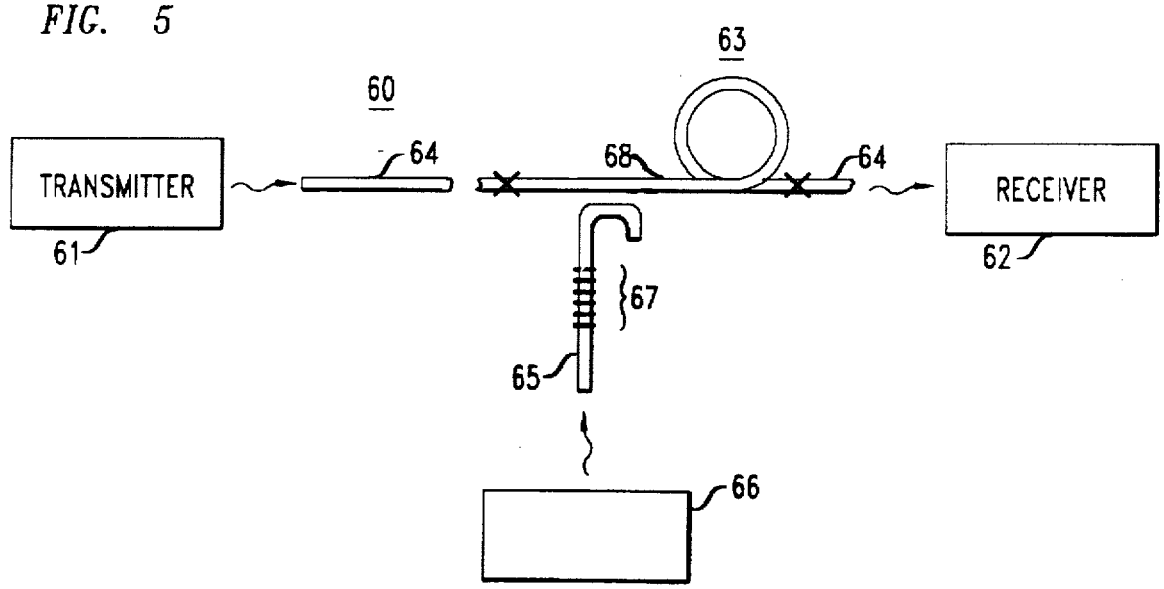
FIG. 5 schematically depicts an exemplary article (an optical fiber communication system) that comprises a grating according to the invention.

FIG. 5 schematically depicts an exemplary article according to the invention, namely an optical fiber communication system 60. The article comprises conventional transmitter 61, conventional receiver 62, and an optical fiber transmission path that connects transmitter and receiver. The transmission path comprises optical fiber amplifier 63, as well as conventional transmission fiber 64. The "x" in the transmission path symbolize conventional splices. The amplifier comprises pump laser 66. The laser exemplarily is selected to emit pump radiation of about 980 nm wavelength. The pump radiation is coupled into fiber 65 and coupled into the amplifier fiber by means of conventional wavelength selective coupler (frequently referred to as "WDM") 68. The fiber path from the pump laser to the WDM comprises grating 67 according to the invention, the grating serving to stabilize the output of laser 66.

Figure 6:
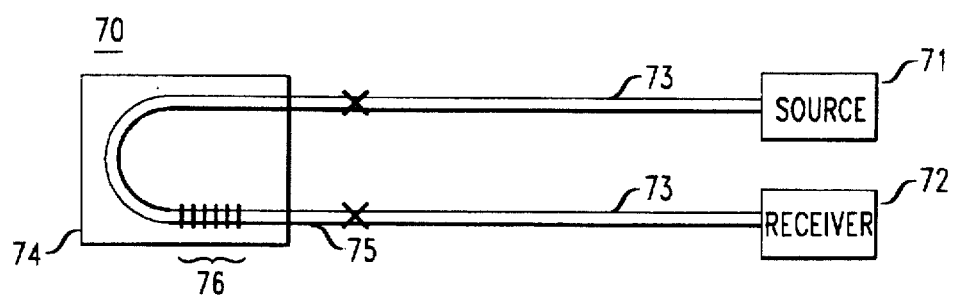
FIG. 6 schematically depicts a further exemplary article according to the invention, namely, a temperature or strain monitoring system.

FIG. 6 schematically depicts a further exemplary article according to the invention, namely a temperature or strain sensing system 70. The article comprises a conventional radiation source 71, a conventional radiation detector 72, conventional optical fiber 73 that connects, together with sensor fiber 75, the radiation source to the detector. Member 74 is the object to be monitored, and 76 refers to the grating according to the invention. Exemplarily, change in the temperature or stress state of member 74 causes a change in the spacing of the grating, and consequently in the transmission through the grating at a predetermined wavelength.

The invention claimed is:

1. Method of making an article comprising an optical fiber refractive index grating, the method comprising
   a) providing a sensitizer-loaded silica-based optical fiber having a Ge-doped core and a longitudinal axis; and
   b) exposing the optical fiber to actinic radiation of varying intensity along the longitudinal axis of the optical fiber, the varying intensity selected such that the refractive index grating is formed in the core;
   c) the optical fiber is exposed to the actinic radiation through a fiber coating; and
   d) the optical fiber is selected to have a germanium-oxygen deficiency center content selected to provide the fiber with a photosensitivity that is at least twice as large as the photosensitivity of an otherwise identical, conventionally prepared, optical fiber, where "photosensitivity" is $\Delta n$/dose of actinic radiation, where $\Delta n$ is the refractive index change that results from exposure of the fiber to a predetermined dose of the actinic radiation, and where the conventionally prepared optical fiber is an optical fiber that was drawn from a preform that was prepared by a method that did not comprise a step during which germanosilicate preform material is contacted with an atmosphere selected to favor reduction of $Ge^{4+}$ to $Ge^{2+}$ in the preform material.

2. Method according to claim 1, wherein the optical fiber has attenuation at 240 nm that is at least 20 dB/mm mol % Ge.

3. Method according to claim 2, wherein the optical fiber has attenuation at 240 nm of 100 dB/mm mol % Ge or more.

4. Method according to claim 1, wherein the fiber coating is a photodegradable polymer coating.

5. Method according to claim 4, wherein the fiber coating is a photodegradable glass resin coating.

6. Method according to claim 1, wherein said atmosphere contains less than 10% $O_2$ by volume.

7. Method according to claim 6, wherein the atmosphere contains at most 4% $O_2$ by volume.

8. Method according to claim 7, wherein the atmosphere is substantially $O_2$ free.

9. Method according to claim 1, wherein the optical fiber refractive index grating is a Bragg-grating.

10. Method according to claim 1, wherein the optical fiber refractive index grating is a long period grating.

11. Article comprising an optical fiber refractive index grating in a coated optical fiber, the fiber grating made according to the method of claim 1.

12. Article according to claim 11, wherein the article is an optical fiber communication system comprising a transmitter, a receiver, and an optical fiber transmission path signal-transmissively connecting the transmitter and receiver, wherein the transmission path comprises an erbium doped fiber amplifier comprising a pump laser that emits pump radiation of about 980 nm wavelength, said pump radiation coupled into a length of coated optical fiber that is optically connected to said transmission path, the length of optical fiber containing said optical fiber refractive index grating, the grating selected to stabilize the pump laser output.

13. Article according to claim 11, wherein the article is an optical fiber sensor for sensing a change in the temperature of the grating, or for sensing a strain in the grating.

* * * * *